Feb. 10, 1970  A. K. GAST, JR  3,494,230
AUTOMATIC SELF-TIGHTENING CHUCK FOR SHADE CUTTING MACHINES
Filed Nov. 4, 1966  4 Sheets-Sheet 1

INVENTOR
ALBERT K. GAST, JR.

BY

ATTORNEYS

Feb. 10, 1970    A. K. GAST, JR    3,494,230
AUTOMATIC SELF-TIGHTENING CHUCK FOR SHADE CUTTING MACHINES
Filed Nov. 4, 1966    4 Sheets-Sheet 2

INVENTOR
ALBERT K. GAST, JR.
BY
ATTORNEYS

Feb. 10, 1970  A. K. GAST, JR  3,494,230
AUTOMATIC SELF-TIGHTENING CHUCK FOR SHADE CUTTING MACHINES
Filed Nov. 4, 1966  4 Sheets-Sheet 3

INVENTOR
ALBERT K. GAST, JR.
BY
*Manzell, Johnston, Cook + Root*
ATTORNEYS

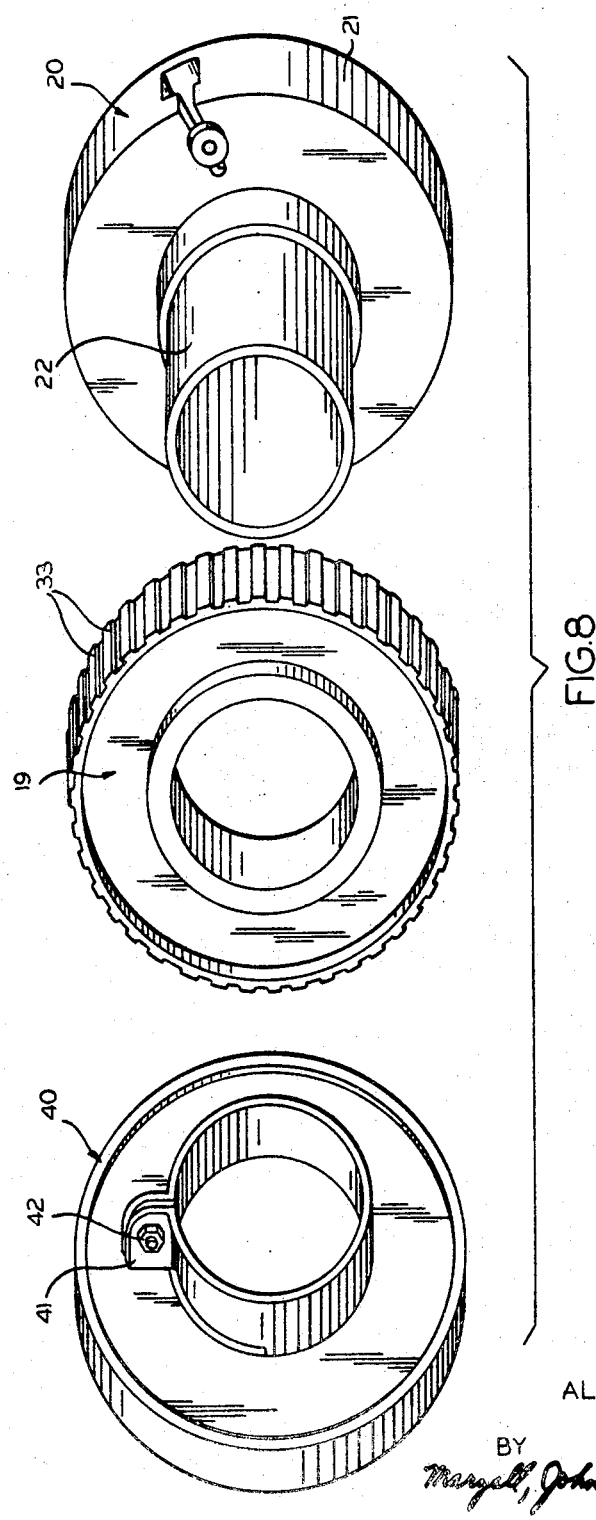

United States Patent Office 3,494,230
Patented Feb. 10, 1970

1

3,494,230
AUTOMATIC SELF-TIGHTENING CHUCK FOR
SHADE CUTTING MACHINES
Albert K. Gast, Jr., St. Joseph, Mich., assignor to Star
Shade Cutter Company, St. Joseph, Mich., a partnership
Filed Nov. 4, 1966, Ser. No. 592,144
Int. Cl. B23b *3/04, 5/14, 23/02*
U.S. Cl. 82—101                                  4 Claims This invention relates in general to an automatic self-tightening chuck especially useful for shade cutting machines, although other uses and purposes may be apparent to one skilled in the art.

Window shades are generally made in standard sizes, yet the requirement for still other sizes is frequently required because of the many different widths of windows used in building construction. Such necessitates the retailer to custom-cut many shades, and heretofore this has been accomplished by shade cutting machines, such as the type disclosed in Gast Patent No. 1,964,984, issued July 3, 1934, and Gast Patent No. 2,326,293, issued Aug. 10, 1943, and Gast et al. Patent No. 2,888,048, issued on May 26, 1959. While the shade cutting machines disclosed in these patents are adapted to quickly and easily perform the necessary operations for cutting a window shade, all have been equipped with a manually operable chuck which requires a certain time to tighten and untighten when inserting and withdrawing a shade from the machine. Further, some operators have encountered difficulties in operating such a manual chuck that has resulted in damage to a window shade, and therefore costly operation.

The present invention obviates the above identified difficulties and provides an automatic self-tightening chuck that can be easily and quickly operated by even the least skilled person. It is only necessary to insert a window shade within the chuck of the present invention and thereafter energize the motor for driving same, and which also accomplishes tightening of jaws that grip the window shade during cutting operations. At the conclusion of a cutting procedure, the chuck may be loosened very easily and quickly to allow withdrawal of the window shade from the machine. The chuck of the present invention includes a driven member having a plurality of jaws or clamps radially movable toward a central point, and a drive member powered by a motor and associated with the jaws and driven member to close the jaws and rotate the driven member upon energization of the motor.

It is therefore an object of the present invention to provide an automatic self-tightening chuck for a shade cutting machine which enables quick and easy chucking of a window shade for a cutting operation by even the least skilled operator without incurring any damage to the window shades.

Another object of this invention resides in the provision of an automatic self-tightening chuck that comprises a minimum number of parts, and which will have long life with minimum maintenance.

Other objects, features and advantages of the invention will be apparent from the following detailed disclosure, taken in conjunction with the accompanying sheets of drawings, wherein like reference numerals refer to like parts, in which.

2

Figure 1:
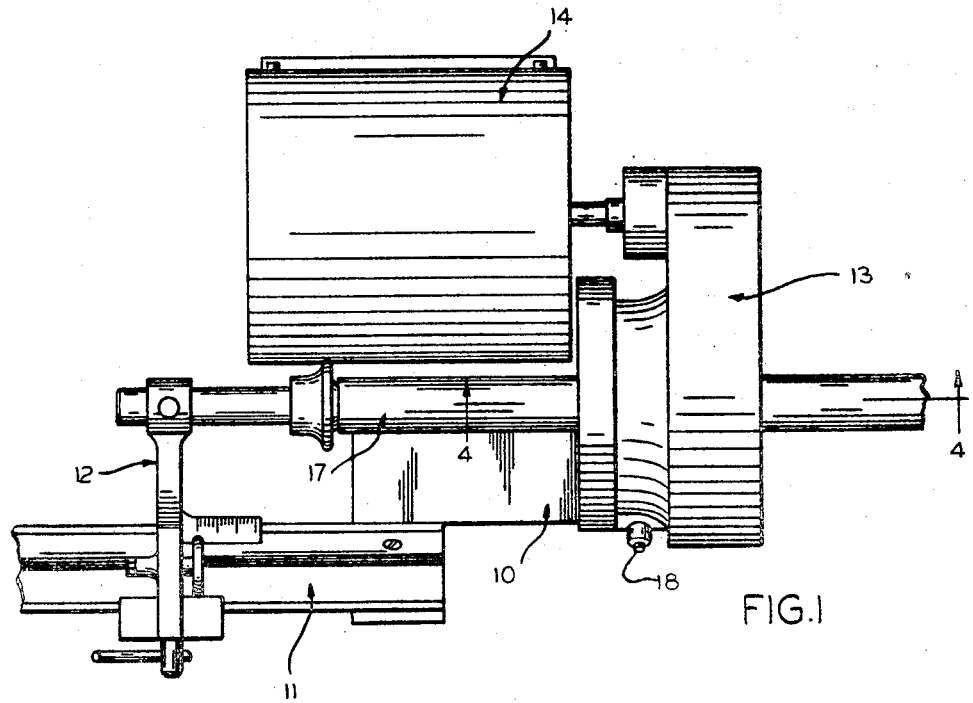
FIG. 1 is a top plan view of a shade cutting machine having an automatic self-tightening chuck according to the present invention with some parts fragmentary for purposes of clarity.
Figure 2:
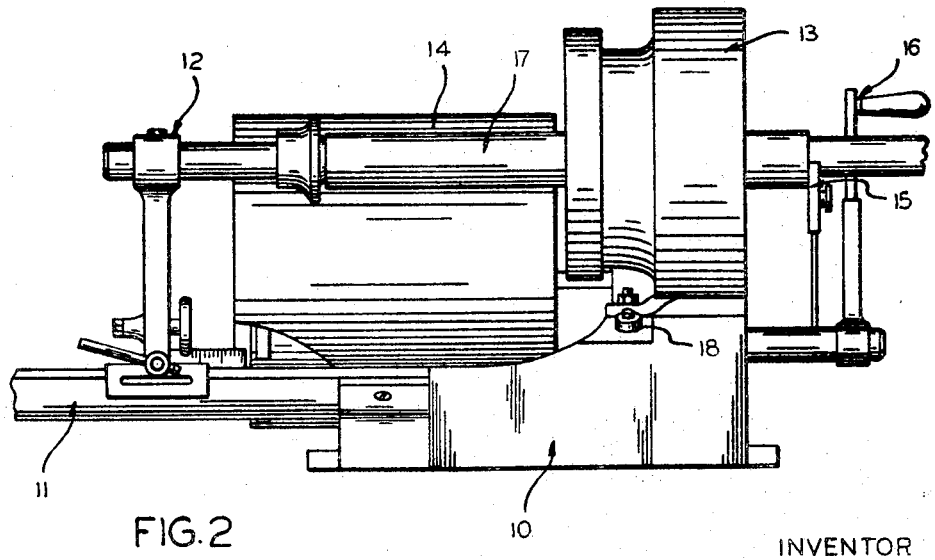
FIG. 2 is a side elevational view of the shade cutting machine and chuck shown in FIG. 1.
Figure 4:
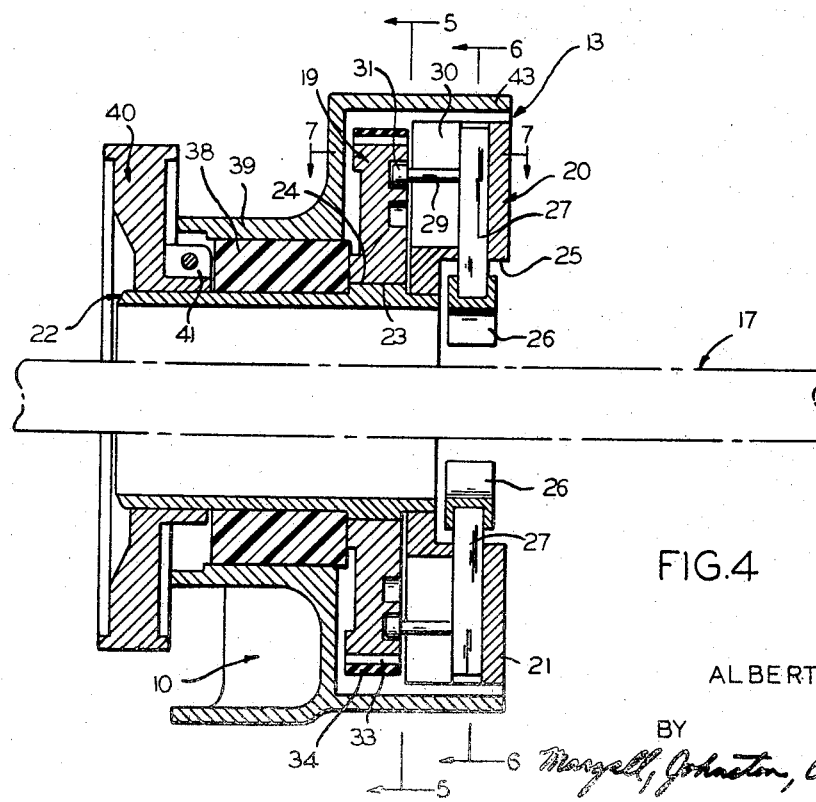
Figure 5:
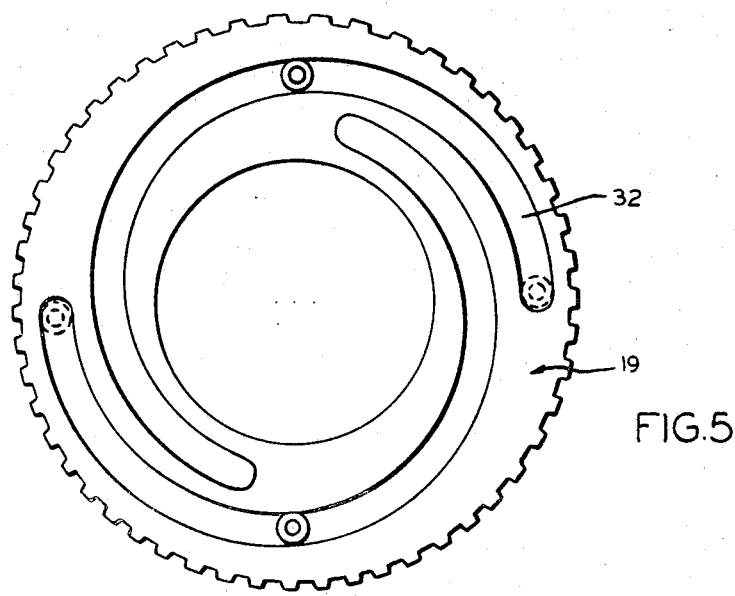
Figure 6:
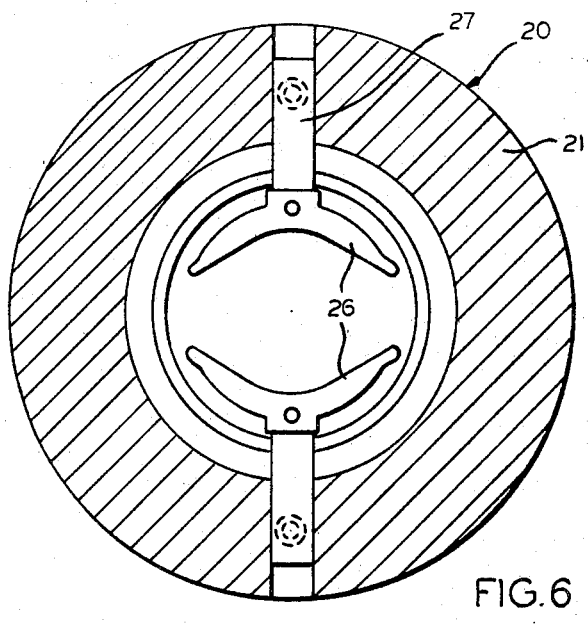
Figure 7:
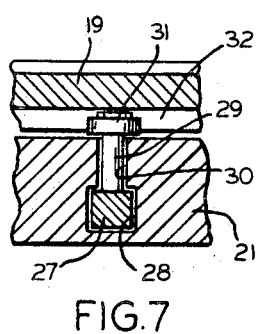

FIG. 4 is an axial sectional view taken through the chuck of the present invention and substantially along line 4—4 of FIG. 1;

FIG. 5 is an end view of the drive member of the chuck according to the present invention and taken substantially along line 5—5 of FIG. 4;

FIG. 6 is a transfer sectional view taken substantially along line 6—6 of FIG. 4;

FIG. 7 is an enlarged fragmentary sectional view taken substantially along line 7—7 of FIG. 4; and FIG. 8 is an exploded perspective view of the chuck according to the present invention.

The shade cutting machine of the present invention includes generally a base 10, a measuring bar 11 extending from one side of the base, an upstanding window shade support bracket 12 adjustably movable along the measuring bar 11, a chuck 13 supported on the base 10 coacting with the support bracket 12 to hold and rotate a window shade, a motor 14 for driving the chuck 13, a shade cutting tool 15 for cutting the shade material on a window shade, and a shade roller cutting tool 16 for cutting the shade roller of a window shade. A window shade 17 is illustrated in position for cutting to size. It should be appreciated that a window shade includes a shade roller usually of wood having wrapped thereover a length of shade material, both of which must be cut in order to bring a window shade to a desired size. The cutting tools 15 and 16 are also supported on the base 10, and a more detailed description of their operation can be appreciated from any of the above mentioned patents. The invention in this application is only concerned with the chuck 13. While a push button switch 18 is shown on the base 10 for energizing the motor 14, it should be appreciated that any other type of switching arrangement may be employed.

Figure 3:
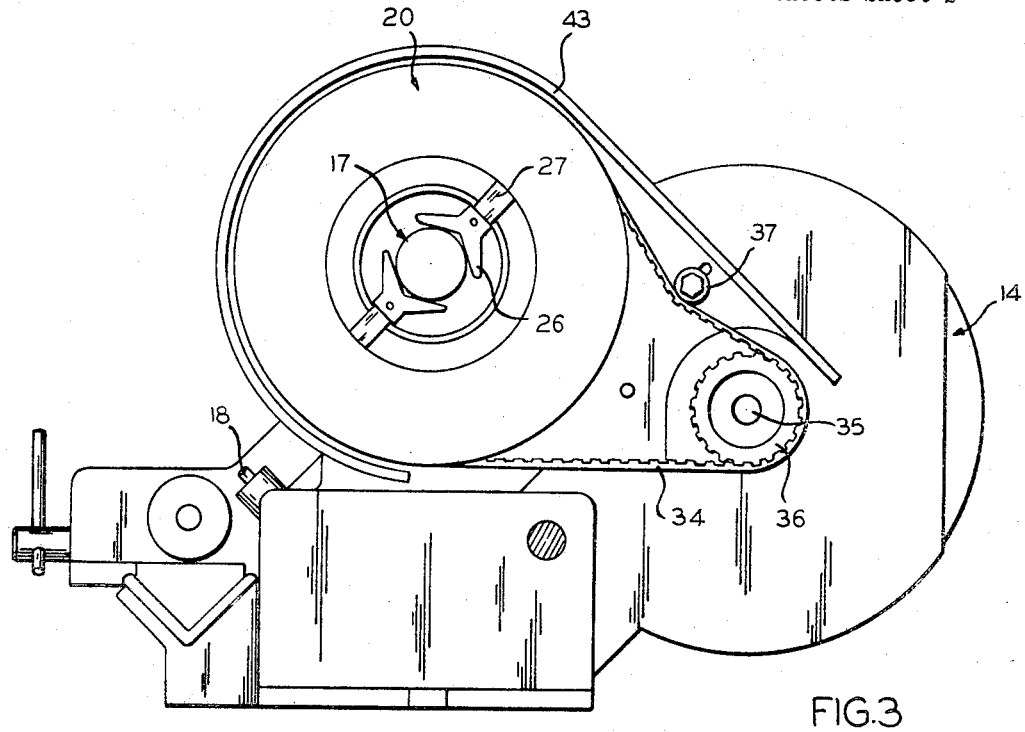
FIG. 3 is a slightly enlarged and elevational view of the shade cutting machine according to the present invention and illustrating with some parts removed the drive train of the chuck.

Referring now to FIGS. 3 and 4, the chuck 13 includes generally a drive member 19 and a driven member 20. The drive member is drivingly connected to the motor 14 in a manner hereinafter to be described. The driven member 20 is annular in shape, and includes a jaw supporting member 21 and a tubular bearing member 22 fixed to the jaw supporting member in any suitable manner. The drive member 19 is also annular in shape and is provided with a cylindrical opening defining a bearing 23 which is in bearing engagement on a bearing surface 24 formed on the tubular sleeve 22.

An annular notch 25 is formed in the jaw supporting member 21 to form a pocket for jaws 26 when they are in completely open position. The jaws are attached onto stems 27 that are slidably received in radially extending bores 28. While the cross section of the bores on stems may be of any suitable type, they must be mating and preferably are rectangular as shown in order to resist rotation of the jaws during clamping and unclamping operations, note particularly FIG. 7. A guide pin 29 extends laterally from each stem 27 and rides in a radially extending slot 30 which opens through the back face of the jaw supporting member 21.

A cam follower or roller 31 is rotatably received on the guide pin 29 and is guidably received in a cam track 32 formed in the front face of the drive member 19. A separate cam track is provided for each of the jaws as seen more clearly in FIG. 5.

The cam tracks 32 of the drive member 19 are helical in form and are provided with such a rise that when the chuck tightens it can be easily loosened by turning the driven member in a direction opposite to the driving direction. More particularly, the rise in the cam tracks may be on the order of .0025 inch per degree.

The outer peripheral face of the drive member 19 is provided with circumferentially spaced gear teeth 33 that are in meshing engagement with a gear belt 34. The motor 14 is provided with a drive shaft 35 having a gear tooth pulley 36 thereon also in meshing engagement with the belt 34. An adjustable tensioning roller 37 is provided for engaging one of the runs between the drive member 19 and pulley or sprocket 36 to provide the proper tension on the belt 34. Thus, a positive driving connection is established between the motor and the chuck.

The driven member 20 is rotatably carried by the base 10, wherein the tubular bearing member 22 is received within a sleeve bearing 38, preferably of plastic-like nylon, and which is supported by an annular flange 39 formed on the base 10. The driving member is held against the driven member by placement of the driving member tubular portion 22 and which is further held in place by securing an annular retaining ring 40 on the inner end of the tubular member 22, as seen particularly in FIG. 4. The retaining ring 40 includes a clamping portion 41 that may be tightened onto the tubular member 22 by tightening of a fastener 42. The retaining ring 40 also serves to unloosen the chuck so that it may be thereafter opened upon completion of a cutting operation on a shade. A protective flange or guard plate 43 extends from the annular flange 39 to overlie the drive and driven members.

In operation, the jaws 26 are initially positioned opened for receiving a window shade that may be inserted through the tubular member 22 and so one end is received by the support bracket 12. The chuck may be initially slightly closed by grasping the retaining ring 40 and turning the driven member in the direction of drive rotation. Thereafter energization of the motor 14 automatically tightens the chuck by urging through the drive member 19 the movement of the jaws 26 toward their innermost position in gripping relation with the window shades. At the completion of the cutting operation, rotation of the driven member 20 by grasping of the retainer ring 40 in the direction opposite to the driving direction of the chuck causes the jaws to move toward open position to release the window shade. Thus, the chuck may be easily and quickly operated merely by the manipulation of the operator's hands.

It will be understood that modifications and variations may be effected without departing from the scope of the modern concepts of the present invention, but it is understood that this application is to be limited only by the scope of the appended claims.

The invention is hereby claimed as follows:

1. A self-tightening chuck for gripping and rotatably driving elongated articles comprising a base, a driven member and a driving member, said driven member including an annular jaw support having a tubular bearing member axially aligned and extending therefrom, a pedestal bearing on said base bearingly engaging and supporting said tubular bearing member, a protective flange extending from said pedestal bearing to overlie the driving and driven members, a pair of diametrically opposed radiallly extending rectangular bores in said jaw support, a pair of rectangular jaw stems matingly and slidably received in said bores, a pair of opposed jaws one on each jaw stem, said driving member including an annular plate bearingly supported on the tubular bearing member of said driven member, a pair of helical cam tracks formed in the radial face of said plate facing said jaw support, a cam follower extending from each stem and one received in each cam track, said driving member having means for connection to a power source, whereby driving rotation of said driving means by said power source causes tightening of said chuck by first rotating the driving member relative the driven member to cause the cam followers to traverse the cam tracks and move the jaw stems and jaws inwardly toward closing upon an article placed in the jaws and thereafter causes co-rotation of the driving member when the jaws are closed upon an article by transmitting rotating force through the cam followers and jaw stems to the driven member, and a ring member secured to said tubular bearing member at the end thereof opposite the annular jaw support for use as a manual control for opening and closing of said jaws.

2. In a shade cutting machine having a base, a self-tightening chuck rotatably carried on said base for receiving and gripping one end of a window shade, means for cutting said shade and a motor for driving said chuck, a driven member and a driving member, said driven member including an annular jaw support having a tubular bearing member axially aligned and extending therefrom, a pedestal bearing on said base bearingly engaging and supporting said tubular bearing member, a protective flange extending from said pedestal bearing to overlie the driving and driven members, a pair of diametrically opposed radially extending rectangular bores in said jaw support, a pair of rectangular jaw stems matingly and slidably received in said bores, a pair of opposed jaws one on each jaw stem, said driving member including an annular plate bearingly supported on the tubular bearing member of said driven member, a pair of helical cam tracks formed in the radial face of said plate facing said jaw support, a cam follower extending from each stem and one received in each cam track, said driving member having means for connection to said motor, whereby driving rotation of said driving means by said motor causes tightening of said chuck by first rotating the driving member relative the driven member to cause the cam followers to traverse the cam tracks and move the jaw stems and jaws inwardly toward closing upon an article placed in the jaws and thereafter causes co-rotation of the driving member when the jaws are closed upon an article by transmitting rotating force through the cam followers and jaw stem to the driven member, and a ring member secured to said tubular bearing member at the end thereof opposite the annular jaw support for use as a manual control for opening and closing of said jaws.

3. The combination as defined in claim 2, wherein each cam track has such a rise that when the chuck tightens it can be easily loosened by turning the driven member in the direction opposite to the driving direction.

4. The combination as defined in claim 3, wherein said rise is .0025 inch per degree.

References Cited

UNITED STATES PATENTS

| 313,562 | 3/1885 | Watson | 82—45 X |
| 875,500 | 12/1907 | Bowser | 82—101 X |
| 1,187,920 | 6/1916 | Muller | 82—40 |
| 2,094,225 | 9/1937 | Tuttle | 82—45 X |
| 2,619,709 | 12/1952 | Ovshinsky | 82—40 |
| 3,261,246 | 7/1966 | Kuts | 82—101 |
| 3,332,694 | 7/1967 | Price | 82—40 X |

HARRISON L. HINSON, Primary Examiner

U.S. Cl. X.R.

82—45, 70.1; 279—66